United States Patent
Peng et al.

(10) Patent No.: US 7,701,707 B2
(45) Date of Patent: Apr. 20, 2010

(54) FIXING APPARATUS FOR HARD DISK DRIVE

(75) Inventors: Wen-Tang Peng, Taipei Hsien (TW); Mo-Ming Yu, Shenzhen (CN); Wei-Chao Huang, Taipei Hsien (TW)

(73) Assignees: Hong Fu Jin Precision Industry (ShenZhen) Co., Ltd., Shenzhen, Guangdong Province (CH); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/963,870

(22) Filed: Dec. 24, 2007

(65) Prior Publication Data

US 2009/0059509 A1 Mar. 5, 2009

(51) Int. Cl.
*G06F 1/16* (2006.01)
(52) U.S. Cl. ............... 361/679.37; 248/618; 364/708.1; 439/638
(58) Field of Classification Search ............... 248/618, 248/633; 361/679.26, 679.27, 679.3, 679.35; 364/708.1; 439/638
See application file for complete search history.

(56) References Cited

U.S. PATENT DOCUMENTS

| 5,654,873 A * | 8/1997 | Smithson et al. ........ 361/679.37 |
| 2007/0211422 A1* | 9/2007 | Liu et al. ..................... 361/685 |
| 2009/0073649 A1* | 3/2009 | Ikeda et al. ............ 361/679.35 |

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive (HDD) having a plurality of holes defined in sidewalls thereof. The fixing apparatus includes a first side plate, a bracket, and a bezel assembly. The first side plate includes a first pivoting portion, and a second pivoting portion formed near and at one end thereof respectively. The bracket includes a second side plate, and a transverse member perpendicular to the second side plated. The transverse member is pivotably attached to the first pivoting portion. The bezel assembly is pivotably attached to the second pivoting portion. The bezel assembly includes a latch bar having a wedged block. The transverse member includes a positioning plate to detachably engage with the wedged block. The first and second side plates include a plurality of fixing members to engage in the holes of the disk drive, respectively.

13 Claims, 4 Drawing Sheets

FIXING APPARATUS FOR HARD DISK DRIVE

CROSS-REFERENCES TO RELATED APPLICATION

Relevant subject matter is disclosed in the 6 co-pending U.S. patent application Ser. Nos. 11/963,871, 11/963,869, 11/963,868, 11/963,864, 11/963,865, 11/963,867; filed on the same date and having a same title as the present application, which are assigned to the same assignee as this patent application. Relevant subject matter is also disclosed in the co-pending U.S. patent application Ser. No. 11/953,863, filed on Dec. 11, 2007, having a same title as the present application, which is assigned to the same assignee as this patent application.

BACKGROUND

1. Field of the Invention

The present invention relates to fixing apparatuses, and particularly to a fixing apparatus for hard disk drives (HDDs).

2. Description of Related Art

The conventional approach now being adopted to mount a HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installing and removing operations of the HDD tedious.

What is desired, therefore, is a fixing apparatus which allows convenient installation and removal of an HDD.

SUMMARY

An exemplary fixing apparatus is for mounting a hard disk drive (HDD) having a plurality of holes defined in sidewalls thereof. The fixing apparatus includes a first side plate, a bracket, and a bezel assembly. The first side plate includes a first pivoting portion, and a second pivoting portion formed near and at one end thereof respectively. The bracket includes a second side plate, and a transverse member perpendicular to the second side plated. The transverse member is pivotably attached to the first pivoting portion. The bezel assembly is pivotably attached to the second pivoting portion. The bezel assembly includes a latch bar having a wedged block. The transverse member includes a positioning plate to detachably engage with the wedged block. The first and second side plates include a plurality of fixing members to engage in the holes of the disk drive, respectively.

Other advantages and novel features will become more apparent from the following detailed description when taken in conjunction with the accompanying drawings, in which:

DETAILED DESCRIPTION OF THE EMBODIMENT

Figure 1:
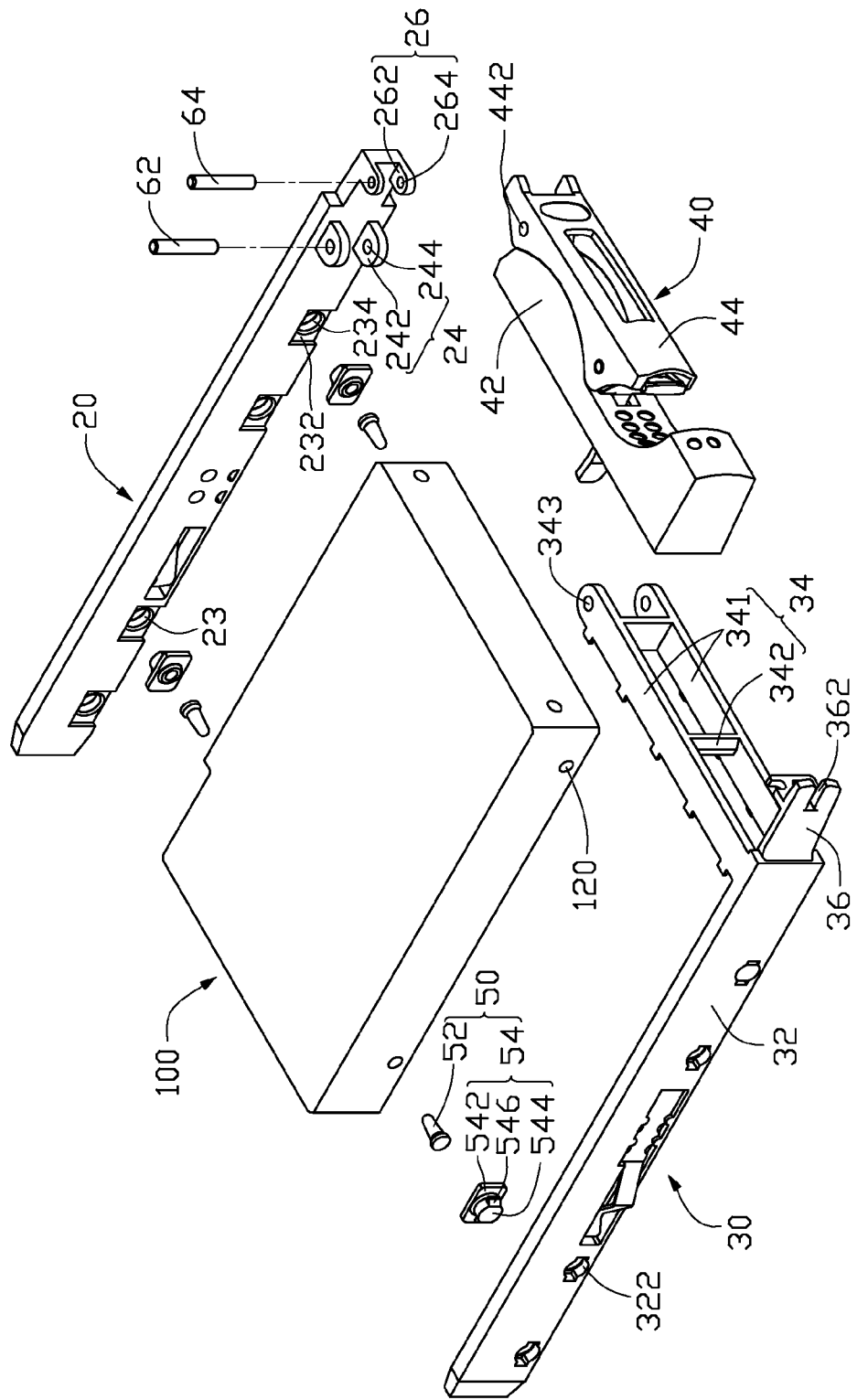
FIGS. 1 and 2 are exploded, isometric views of a fixing apparatus of an embodiment of the present invention together with an HDD, but viewed in different aspects.
Figure 2:
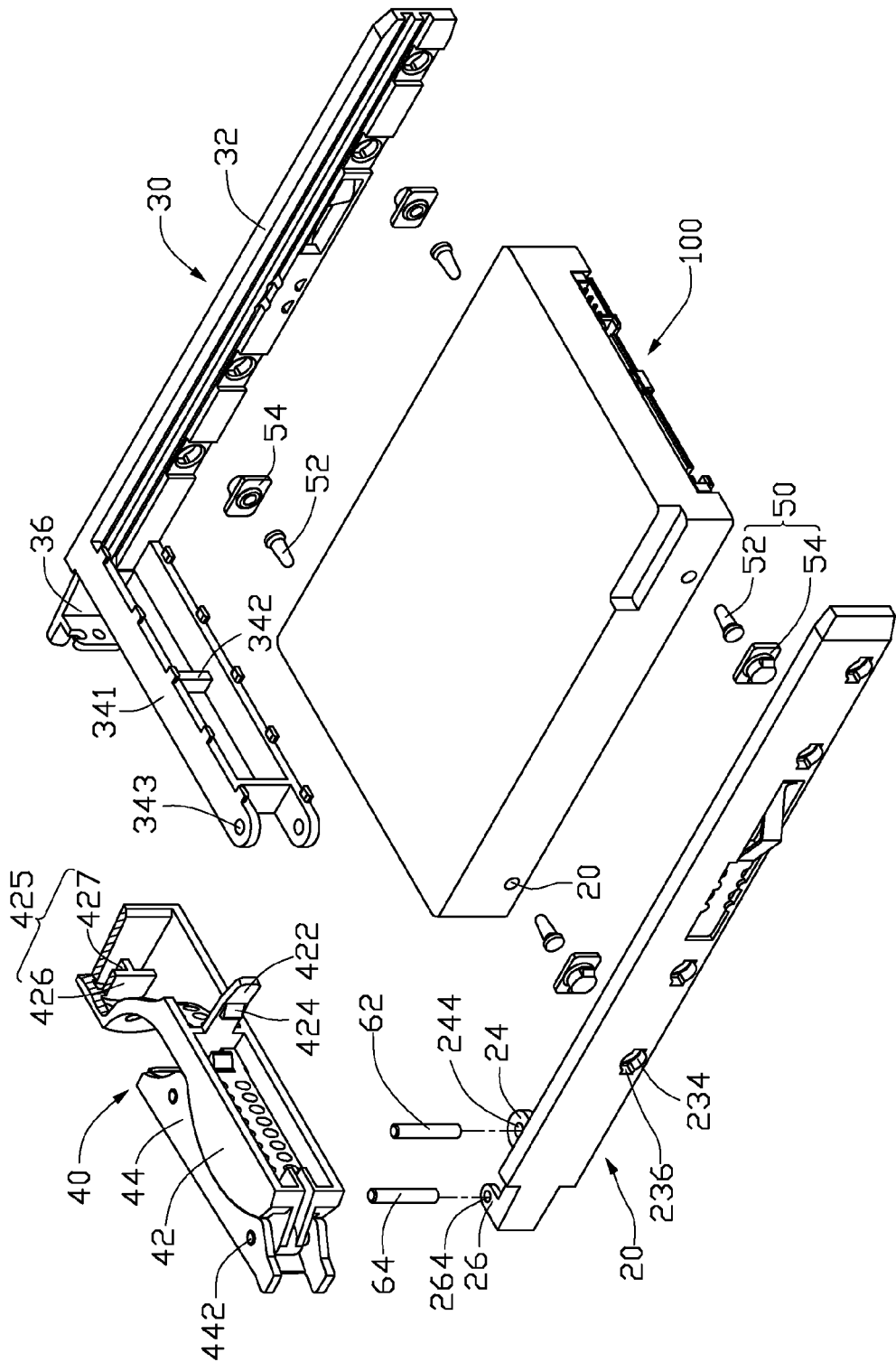

Referring to FIGS. 1 and 2, a fixing apparatus in accordance with an embodiment of the present invention is for fixing a hard disk drive (HDD) 100 and includes a first side plate 20, a bracket 30, a bezel assembly 40, and two shafts 62, 64.

The HDD 100 includes a pair of holes 120 defined in each of two opposite sidewalls thereof.

The first side plate 20 includes a first pivoting portion 24 extending perpendicularly from an inside of and near one end thereof, and a second pivoting portion 26 extending from the inside at the one end thereof. The first pivoting portion 24 includes a pair of parallel spaced tabs 242 each having a pivoting hole 244. The second pivoting portion 26 includes a pair of parallel spaced tabs 262 each having a pivoting hole 264. The first side plate 20 includes a plurality of mounting holes 23 defined therein to retain a plurality of fixing members 50 therein. Each of the mounting holes 23 includes a rectangular recess 232, a cylindrical hole 234, and a pair of slots 236 oppositely extending from and communicating with the cylindrical hole 234.

The bracket 30 includes a second side plate 32, a transverse member 34 extending perpendicularly from one end of the second side plate 32, and an extension portion 36 extending forward from the end of the second side plate 32. The transverse member 34 includes a pair of spaced horizontal plates 341, and a positioning plate 342 perpendicularly disposed between the horizontal plates 341. A pair of vertically aligned pivoting holes 343 is defined in a free end of each of the horizontal plates 341 respectively. The extension portion 36 includes a locating cutout 362 defined therein. The second side plate 32 includes a plurality of mounting holes 322 defined therein to retain a plurality of fixing members 50. Each of the mounting holes 322 has a similar configuration as the mounting hole 23 of the first side plate 20.

The bezel assembly 40 includes a bezel 42, and a handle 44 pivotably engaging with the bezel 42. The handle 44 includes a pair of vertically aligned pivoting holes 442 respectively defined in an upper portion and a lower portion thereof. The bezel 42 includes a receiving space defined therein. A locking portion 425 is formed in the receiving space near a sidewall of the bezel 42 and includes a vertical board 426, and a locating board 427 perpendicularly extending from the vertical board 426. A latch bar 422 extends perpendicularly from an inside wall of the receiving space and includes a wedged block 424 extending from a side thereof.

Each of the fixing members 50 includes a cap 54, and a pin 52 with one end embedded in the cap 54. The pin 52 is made of metal. The cap 54 is made of shock absorbing material, such as rubber. Each cap 54 includes a rectangular portion 542, a cylindrical portion 544 perpendicularly extending from the rectangular portion 542, and a pair of wedged protrusions 546 extending opposite to each other from a circumferential wall of the cylindrical portion 544.

The fixing members 50 are attached to the side plate 22 of the first side plate 20, with the rectangular portions 542 of the caps 54 engaging in the rectangular recesses 232 of the side plate 22, the cylindrical portions 544 of the caps 54 engaging in the cylindrical holes 234 of the side plate 22, and the wedged protrusions 546 engaging in the slots 236 of the side plate 22. The fixing members 50 are also attached to the side plate 32 of the bracket 30 in a same way as to the first side plate 20.

Figure 3:
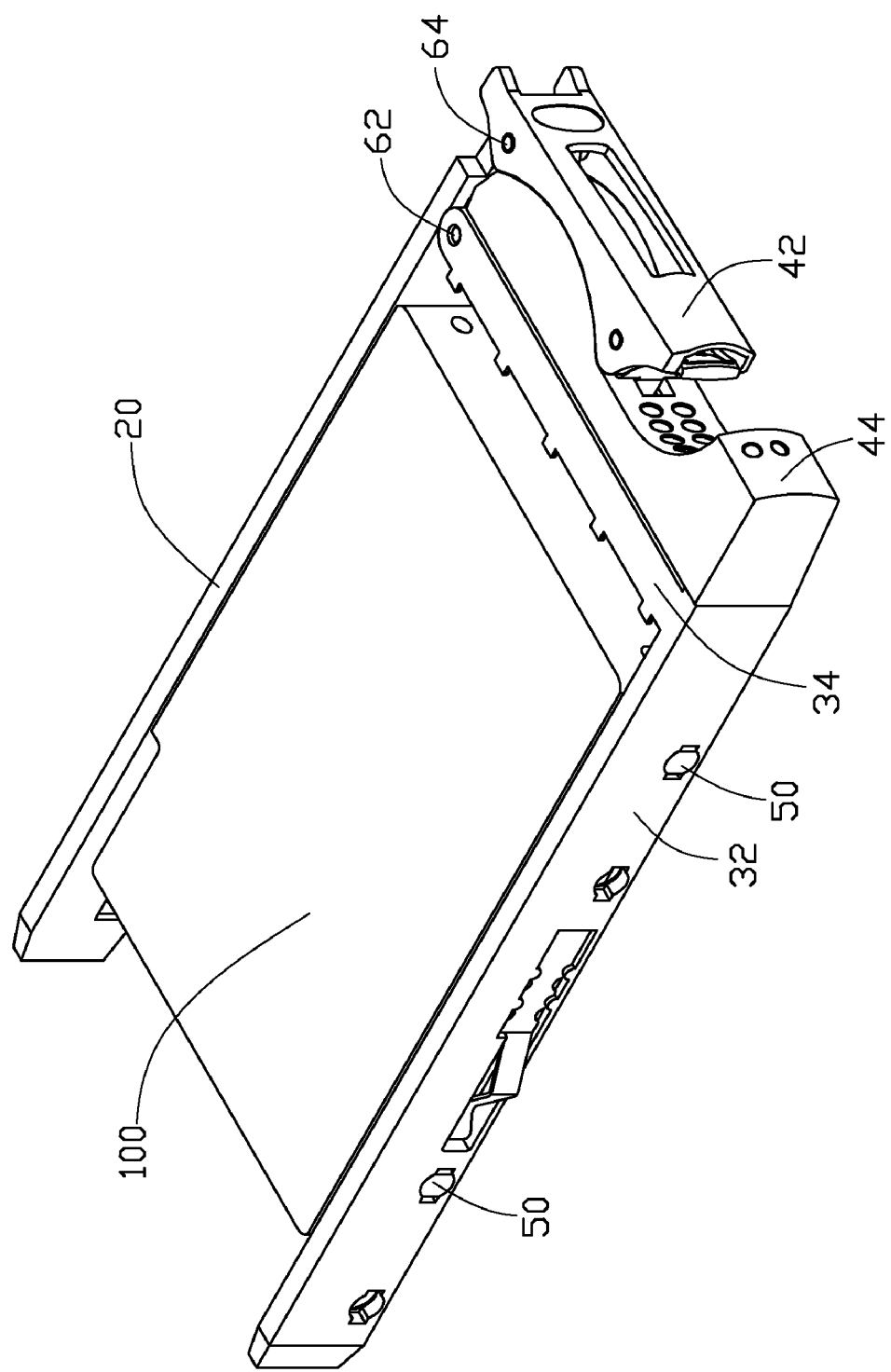
FIGS. 3 and 4 are assembled views of the fixing apparatus of FIG. 1, respectively showing the HDD in a locking position and a releasing position.
Figure 4:
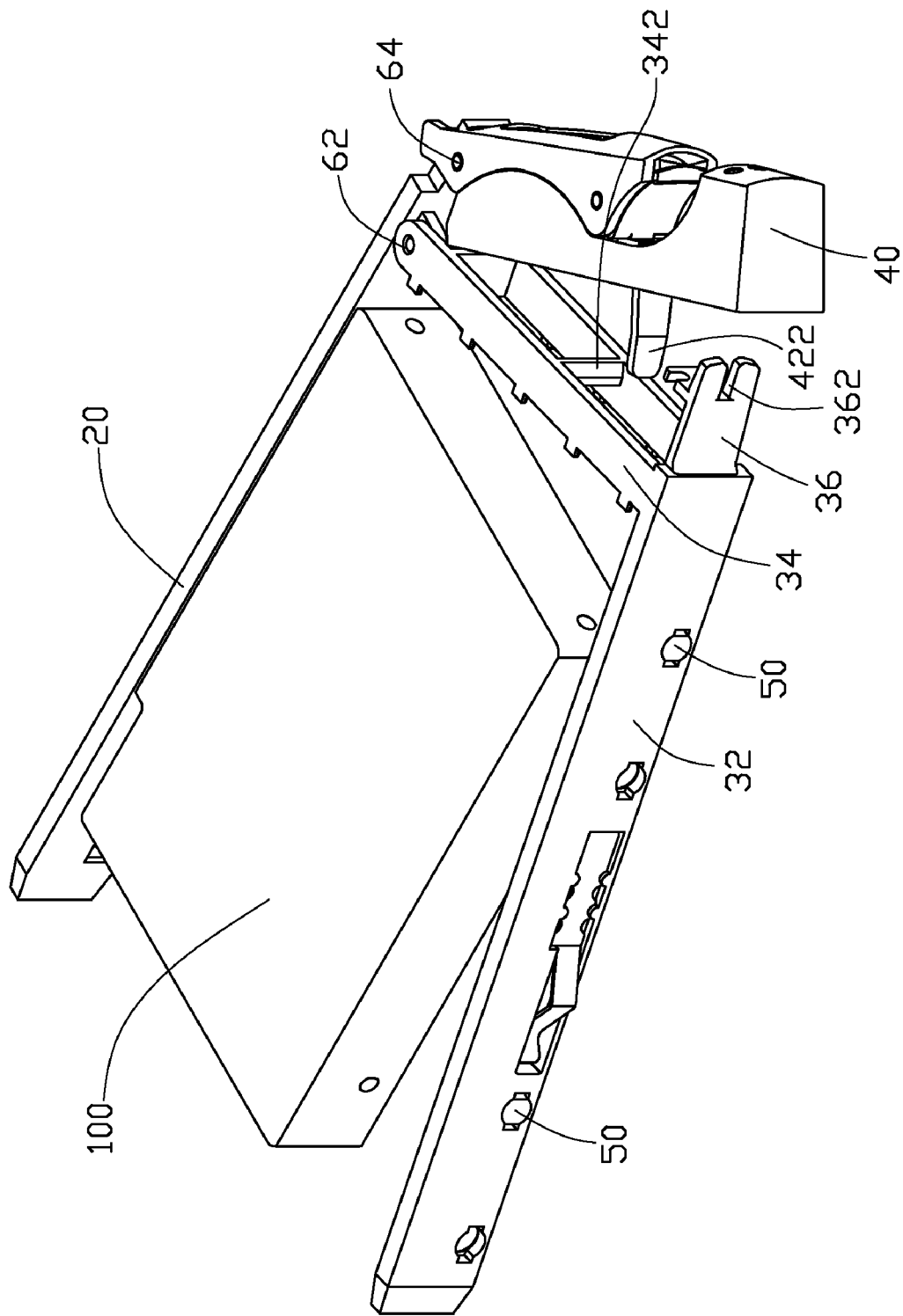

Referring also to FIGS. 3 and 4, in assembly, the bracket 30 is pivotably attached to the first pivoting portion 24 of the first side plate 20, with the tabs 242 of the first pivoting portion 24 sandwiched between the horizontal plate 341 of the transverse member 34 of the bracket 30. The shaft 62 extends through the pivoting holes 343 of the transverse member 34 of the bracket 30 and the pivoting hole 244 of the first pivoting portion 24 of the first side plate 20. The bezel assembly 40 is pivotably attached to the first side plate 20, with the tabs 262 of the second pivoting portion 26 of the first side plate 20 sandwiched between the upper and lower portions of the handle 44 of the bezel assembly 40. The shaft 64 extends through the pivoting holes 442 of the bezel assembly 40 and the pivoting holes 264 of the second pivoting portion 26 of the first side plate 20. The extension portion 36 of the bracket 30 extends into the receiving space of the bezel 42, with the locating cutout 362 engaging with the locating board 427 of the bezel 42 and the wedged block 424 of the latch bar 422 detachably engaging with the positioning plate 342 of the bracket 30.

Referring also to FIG. 4, in use, the latch bar 422 of the bezel assembly 40 is pushed so as to disengage the wedged block 424 thereof from the positioning plate 342 of the bracket 30. Thus, the bezel assembly 40 is pivoted about the shaft 64 to move away from the bracket 30. Subsequently, the bracket 30 is pivoted about the shaft 62 to move away from the first side plate 20 to allow the HDD 100 to be placed between the first side plate 20 and the bracket 30. The pins 52 of the fixing members 50 of the first side plate 20 extend into the holes 120 of one sidewall of the HDD 10. Then, the bracket 30 is pivoted back to the HDD 100 so that the pins 52 of the second side plate 32 extend into the holes 120 of the other sidewall of the HDD 100. Finally, the bezel assembly 40 is pivoted to the transverse member 34 of the bracket 30, with the locating cutout 362 of the bracket 30 engaging with the locating board 427 of the bezel assembly 40 and the wedged block 424 of the latch bar 422 latching with the positioning plate 342 of the bracket 30. Thus, the HDD 100 is secured.

To release the HDD 100, the latch bar 422 of the bezel assembly 40 is moved to disengage the wedged block 424 thereof from the positioning plate 342 of the bracket 30. Then, the bezel assembly 40 is pivoted about the shaft 64 to move away from the bracket 30, and the bracket 30 is pivoted about the shaft 62 to move away from the first side plate 20. Thus, the HDD 100 can be easily detached.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:
    a first side plate with a first pivoting portion, and a second pivoting portion, both formed on the first side plate, and located near and at one end of the first slide plate respectively;
    a bracket comprising a second side plate, and a transverse member perpendicular to the second side plate, the transverse member pivotably attached to the first pivoting portion of the first side plate, a positioning plate formed on the transverse member;
    a bezel assembly pivotably attached to the second pivoting portion of the first side plate and a latch formed on the bezel assembly, the latch having a wedged block detachably engaging with the positioning plate of the bracket; and
    a plurality of fixing members attached to the first side plate and the second side plate of the bracket to engage in the holes of the HDD respectively.

2. The fixing apparatus as claimed in claim 1, wherein the transverse member of the bracket comprises a pair of spaced plates, the positioning plate is perpendicularly disposed between the spaced plates.

3. The fixing apparatus as claimed in claim 2, wherein the spaced plates of the bracket comprise a pair of pivoting holes defined in free end portions thereof, the first pivoting portion of the first side plate comprises a pair of spaced tabs each defining a pivoting hole, the spaced tabs are sandwiched between the spaced plates, a shaft is extended through the pivoting holes of the spaced tabs and the first pivoting portion.

4. The fixing apparatus as claimed in claim 1, wherein the bezel assembly comprises a handle having a pair of pivoting holes defined in two spaced portions thereof, the second pivoting portion of the first side plate comprises a pair of spaced tabs each having a pivoting hole, the tabs of the second pivoting portion are sandwiched between the spaced portions of the handle, a shaft is extended through the pivoting holes of the handle and the second pivoting portion of the first side plate to pivotably connect the bezel assembly to the first side plate.

5. The fixing apparatus as claimed in claim 1, wherein each of the fixing members comprises a cap, and a pin with one end embedded in the cap.

6. The fixing apparatus as claimed in claim 5, wherein the cap comprises a rectangular portion, a cylindrical portion perpendicularly extending from the rectangular portion, and a pair of wedged protrusions extending oppositely from a circumferential wall of the cylindrical portion, the first and second side plates comprise a plurality of mounting holes defined therein to retain the fixing members.

7. A fixing apparatus for fixing a hard disk drive (HDD) with a plurality of holes defined in sidewalls thereof, the fixing apparatus comprising:
    a first side plate;
    a bracket comprising a second side plate, and a transverse member perpendicularly extending from the second side plate, the transverse member being pivotably attached to the first side plate;
    a bezel assembly pivotably attached to the first side plate between a first position where the bezel engaging with the bracket and preventing the bracket from pivoting related to first slide plate, and a second position where the bezel disengaging with the bracket and enabling the bracket to pivot related to first slide plate; and
    a plurality of fixing members attached to the first side plate and the second side plate of the bracket to engage in the holes of the HDD respectively.

8. The fixing apparatus as claimed in claim 7, wherein an extension portion extends from the second side plate, the extension portion defining a locating cutout, a locking portion is formed on the bezel and engages in the cutout of the extension portion in response to the bezel is pivoted to the first position.

9. The fixing apparatus as claimed in claim 7, wherein a positioning plate is formed on the transverse member, a latch bar extends from the bezel and engages with the positioning plate to hold the bezel at the first position.

10. The fixing apparatus as claimed in claim 9, wherein the latch forms a wedged block detachably locking with the positioning plate.

11. The fixing apparatus as claimed in claim 9, wherein the transverse member of the bracket comprises a pair of parallel plates, each of the parallel plate defines a pivoting hole, a first pivoting portion is formed on an end of the first side plate and sandwiched between the parallel plates of the bracket, a first shaft is extended through the pivoting holes of parallel plate and the first pivoting portion.

12. The fixing apparatus as claimed in claim 11, wherein a second pivoting portion is formed on the first side plate near the first pivoting portion, the bezel defines a pivoting hole, a second shaft is extended through the pivoting holes of bezel and the second pivoting portion.

13. The fixing apparatus as claimed in claim 12, wherein the first and second shafts are substantially parallel to each other.

* * * * *